358-86. OR 3,093,706 SR

SEARCH ROOM

T5006
X5027
Rm

INVENTOR:
Walter J. Karplus
By Smyth & Roston
Attorneys

June 11, 1963 W. J. KARPLUS 3,093,706

TELEVISION SYSTEM

Filed Feb. 25, 1958 2 Sheets-Sheet 2

INVENTOR:
Walter J. Karplus
By Smyth & Roston
Attorneys

United States Patent Office 3,093,706

Patented June 11, 1963

3,093,706

TELEVISION SYSTEM

Walter J. Karplus, Los Angeles, Calif., assignor, by mesne assignments, to Electronic Measurement Systems, Inc., Newbury Park, Calif., a corporation of Delaware Filed Feb. 25, 1958, Ser. No. 717,495
19 Claims. (Cl. 178—5.6)

This invention relates to television systems and more particularly to a system for transmitting television signals through power lines without producing any distortions in the characteristics of the signals.

In the past decade, television has become so widely accepted that each home generally has at least one television set. Sales of new and replacement sets run to millions per year. Watching television programs has become the household synonym for leisure in the evening and even during the day.

The television systems now in use transmit signals to the different receivers without any charge for viewing programs. Costs are paid in general by advertisers who sponsor the television programs. However, systems have been proposed and developed in which programs can be viewed only when the viewer is charged a nominal amount for the program and in which advertisers would not be needed to assume the cost. This type of system is known as "Pay Television" or more colloquially as "Pay-TV."

In the systems now in use and especially the pay television systems, coaxial lines are required to transmit the signals from the television station to the different receivers. Transmission through coaxial line is relatively expensive, primarily because of the high cost of making such lines and of installing them in the paths extending from the transmitter to the receiver. Although various programs have been advanced for overcoming these high costs, none of these proposals has been entirely acceptable.

One completely acceptable procedure would be to use power lines instead of coaxial lines to transmit the signals since the power lines have already been built. This procedure has never been seriously considered since it has been the opinion of so-called "experts" that television signals could not be transmitted through power lines without producing excessive distortions in the characteristics of the signals. These excessive distortions would prevent the visual images and the accompanying sound from being reproduced with any fidelity at the receivers.

I have found that television signals can be transmitted through power lines by placing at least a pair of power lines in closely spaced relationship to each other. The close spacing between the pair of power lines causes the radiation from one of the lines to be cancelled by the radiation from the other line so that relatively small power losses occur in the transmission of the television signals through the line. The radiation losses are further minimized by maintaining a fixed distance between the lines since the pattern of radiation cancellation is dependent upon the distance between the lines. In one embodiment of the invention, a pair of power lines are maintained in fixed and closely spaced relationship by spirally winding one of the lines relatively tightly around the other line. In this way, the distance between the lines cannot be affected by such factors as bursts of wind.

This invention is based upon experiments and actual tests which indicate that television signals can be transmitted through power lines without producing any material distortions in the signals. This invention sets forth a system for using power lines to provide a transmission of television signals. The invention includes the combination of means with the power lines to inhibit radiation of energy from the power lines and to prevent any distortion in the signals as the signals travel through the power lines.

One embodiment of the inhibiting means set forth in the previous paragraph may include a conductor closely looped around the power line at spaced intervals to create an electrical field opposing the electrical field produced by the power line. Electrical circuitry is coupled to the power line and the electrical conductor to maintain the power line and the electrical conductor at substantially the same potential with respect to the low frequency alternating voltage introducing power to the homes and to prevent any feedback of the alternating voltage toward the television transmitter.

The system constituting this invention also includes other novel features. For example, in one embodiment of the invention, coaxial lines are used to pass the signals from the transmitter to a point of distribution in a neighborhood. The signals are then passed from the coaxial line to power lines which direct the signals to the different homes in the neighborhood. Electrical circuitry is included in the invention for balancing the impedances of the coaxial line and of the power line to insure that no appreciable distortions in the characteristics of the signals and no appreciable losses in signal strength are produced as the signals pass from the coaxial line to the power line. This circuitry also has sufficiently broad band-pass characteristics to pass the audio and video portions of the television signals without any appreciable loss in either of these portions.

The system constituting this invention also includes circuitry at the home for preventing any interference in the operation of the different appliances and light circuits in the home. For example, electrical circuitry is included at each power outlet other than the power outlet connected to the receiver to filter out the television signals so that interference in the characteristics of the television signals will be minimized. Furthermore, electrical circuitry is included to filter out the alternating electric voltage at the low frequency so that only the television signals are used to control the production of the television picture and the sound accompanying the picture.

Figures 1, 3:
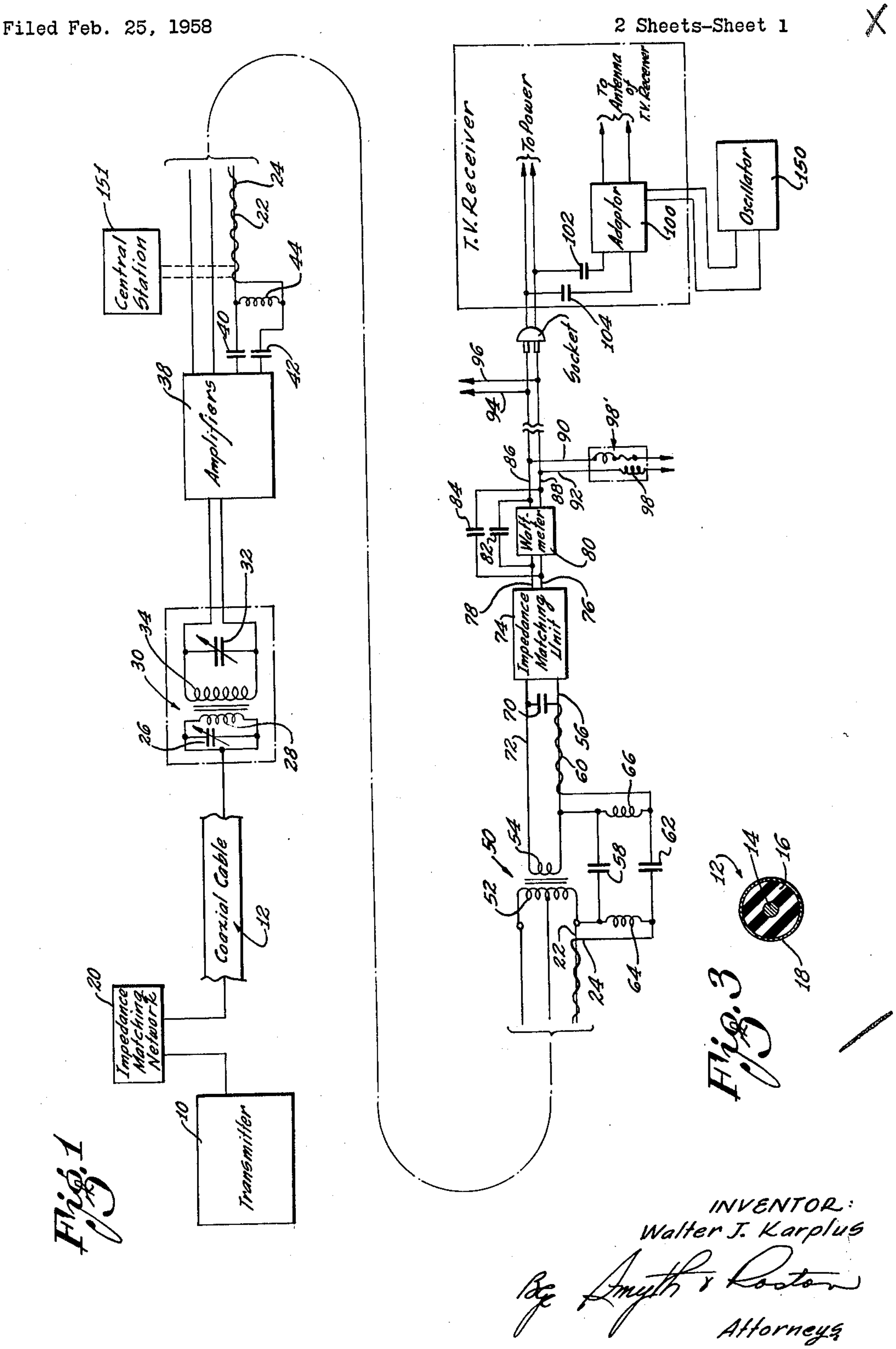
FIGURE 1 is a circuit diagram somewhat schematically illustrating a system constituting one embodiment of the invention.
FIGURE 3 is a sectional view illustrating the construction of a coaxial line included in the system in FIGURE 1.

In the embodiment of the invention shown in FIGURE 1, a television transmitter generally indicated at 10 is constructed to provide first signals modulated in accordance with the visual image at any instant and second signals modulated in accordance with the accompanying sound at that instant. The transmitter 10 is shown in block form since it may be constructed in a manner similar to the television transmitters now in use. Preferably, however, the transmitter has certain distinguishing characteristics with respect to the transmitters now in use.

In the transmitters now in use, the video signals have a relatively low frequency such as approximately 1.25 megacycles above the lower frequency limit of a particular television channel. Since the frequency is relatively close to the lower frequency limit of the channel, only the upper side band is used. The audio portion of the signal has a frequency approximately 0.25 megacycle below the upper frequency limit of the channel. This causes the two signals to have a frequency separation of approximately 4.5 megacycles since the total frequency width of a channel is approximately 6 megacycles. The video signal is amplitude modulated but the audio signal is frequency modulated. Such viedo and audio signals may also be used in this invention.

In the preferred embodiment of the transmitter 10 included in this invention, the video signal has a frequency of approximately 5 megacycles above the lower frequency limit of the channel and the audio signal has a frequency of approximately 0.75 megacycle above the lower frequency limit of the channel. Since the frequency of the video signals approaches the upper frequency limit of the channel, the lower side band of the video signals is used in the preferred embodiment rather than the upper side band as in the conventional transmitters now in use.

In this way, the audio and video signals produced in the preferred embodiment of the transmitter 10 constitute in effect a mirror image of the audio and video signals in the conventional transmitters now in use. This mirror image is used to minimize any distortions produced by the low frequency alternating voltage in the power lines. This voltage has at present a frequency of 60 cycles per second. The distortion from this low frequency alternating voltage and from its harmonics and noise transients is minimized since the signals of relatively low frequency such as 0.75 megacycle above the lower frequency limit of the channel are frequency modulated. Such modulations in frequency are not seriously affected by modulations in amplitude which would be produced by the low frequency alternating voltage.

It should be appreciated that the transmitter 10 described above constitutes only one embodiment which can be used in the invention. For example, it would be possible to frequency modulate the video signals as well as the audio signals. It would also be possible to provide the video and audio signals with modulating characteristics in the range between the upper and lower frequency limits corresponding to the characteristics of the signals in the transmitters now in use. It may also be possible to provide a time-sharing relationship between different video signals and different audio signals when signals for a plurality of channels are transmitted along a single path. It is also possible to use a suppressed carrier type of transmission system. Another possibility may be to use a television signal having exactly the same structure as the signals now in use that is, with the audio carrier having a higher frequency than the video carrier and to use the lower side band of such a transmission.

The signals from the transmitter 10 are introduced to a coaxial line 12 substantially similar to those now in use for transmitting telephone signals and television signals over long distances. The coaxial line 12 is provided with a central conductor 14, a concentric insulator 16 and an external conductor 18 which is concentric with the central conductor 14 and the insulator 16. The central conductor 14 is adapted to receive the television signals and the external conductor 18 is generally grounded.

Preferably, a network generally indicated at 20 is coupled between the transmitter 10 and the coaxial line 12 to provide a match in impedances between the transmitter and the coaxial line. This network may be constructed in a conventional manner from a plurality of reactances, including inductances and capacitances. Such a network is disclosed at pages 447 to 466, inculsive, and pages 499 to 504, inclusive, of "Principles of Television Engineering" by Donald G. Fink (2nd edition).

The television signals are preferably transmitted through the coaxial line to a central point of distribution for a number of houses in a neighborhood. The television signals then pass to power lines which are already connected to receive alternating voltage at a low frequency such as 60 cycles. This alternating voltage is used to supply energy to light homes, offices and plants, to operate appliances including washers and dryers in the homes and to operate machinery in the offices and in the plants.

Although the transfer of the television signals from the coaxial lines to the power lines preferably occurs at a central point of distribution in a neighborhood, this invention also contemplates other possibilites. For example, the coaxial lines may extend to the positions where individual power lines branch outwardly from a main power line to feeder lines terminating at each house. In this way, the power lines would be used for the passage of the television signals only from the final distributing transformer near each house to the house itself. Another possibility would be to use the coaxial cable to the central point in each neighborhood, power lines from the central point to each residence and the coaxial cables within each residence itself. All of these possibilities are included in the broad concept of the invention since they relate to the combined uses of coaxial lines and power lines for the transmission of television signals to the receivers in the different homes.

Impedance matching networks are used to transfer the signals from the coaxial line 12 to the power line 22. Such networks are used since the characteristic impedances of the coaxial line 12 and the power line 22 are different. Furthermore, the coaxial line is unbalanced from an impedance standpoint. This results from the fact that the wire 14 in the coaxial line is at a potential different from ground and the external conductor 18 is at ground potential. On the other hand, the power line 22 is in a balanced impedance relationship even when an additional line 24 is included in a manner similar to that described subsequently.

Various types of networks can be used between the coaxial line and the power line. Such networks can be formed from a plurality of inductors and capacitors. For example, a pair of transformer-coupled tuned circuits can be used as shown in FIGURE 1. One tuned circuit is formed from a variable capacitance 26 and a primary winding 28 of a transformer generally indicated at 30. A second tuned circuit is formed from an adjustable capacitance 32 and a secondary winding 34 of the transformer 30.

The tuned circuit formed by the capacitance 26 and the primary winding 28 and the tuned circuit formed by the capacitance 32 and the secondary winding 34 are adjusted to have a pass band of approximately 6 megacycles. The primary winding 28 and the secondary winding 34 of the transformer 30 are also adjusted to have a turns ratio dependent upon the impedances of the coaxial and the power lines so as to produce a match in impedances between these lines. By providing a proper tuning of the two tuned circuits and by providing a balance in impedances, the signal-to-noise ratio of the television signals relative to random noise is enhanced so that the signals are able to pass from the coaxial line to the power line without any material loss in amplitude and without any material distortion in characteristics.

It may be desirable to amplify the signals passing from the tuned circuit formed by the capacitance 32 and the winding 34 before the signals pass to the power line 22. Such amplification may be obtained in stages indicated in block form at 38 in FIGURE 1. The amplifier stages 38 are shown in block form since they may be constructed in a conventional manner. After being amplified, the television signals are introduced to the power line 22 for transmission to the different houses in a neighborhood.

The power line 22 is only one of a plurality of lines for transmitting electrical energy to homes, offices and plants to light these establishments and to operate the appliances and machinery in these establishments. Generally three power lines are included in a three-phase system. In such a system one of the lines may be grounded and the other two may be at relatively high potentials. If only one power line is to be used, preferably this should be the grounded one. However, the ungrounded power lines may also be used, especially when signals are transmitted for more than one television channel. When the power lines are fairly close together, the radiation from one line tends to cancel the radiation from another line so that no appreciable radiation of the television signals is produced as the signals travel through the lines. This may occur, for example, when the power lines are buried in the ground. Buried power lines are further advantageous in that the distance between them cannot become varied in the wind. Such variations in distance are disadvantageous in that they affect the total radiation patterns of the wires.

In many instances, the power lines are separated by too great a distance to obtain an effective cancellation of the radiations from the power line transmitting the television signals. Such a failure to cancel radiations is considered undesirable since the resultant radiations tend to affect the characteristics of other signals in the area. At such times, certain means may have to be coupled to the power line to minimize the radiation from the power line. One form of such means is shown in FIGURE 1. It includes an electrical conductor which is spirally wound around the power line 22 receiving the television signals. This conductor has already been designated by the numeral 24. The spacing between adjacent turns of the conductor 24 can be relatively great such as in the order of 5 feet. The turns of the conductor 24 are wound relatively tightly around the power line 22 so that there is preferably no more than a quarter inch spacing between the power line and the conductor. This insures that the spacing between the power line 22 and the conductor 24 is relatively small in comparison to the wave length of the audio and video carrier signals. By winding the electrical conductor 24 on the power line 22 in this manner, the signals radiating from the electrical conductor oppose the signals radiated from the power line so that a minimum net amount of radiation is produced. Since the power line 22 and the electrical conductor 24 are closely spaced at all points, interference from sources radiating electrical energy toward the power line and the electrical conductor is also minimized. Furthermore, attenuation of the signals during travel through the power line is minimized and the frequency characteristics of the signals are retained.

As will be described in detail subsequently, the wound conductor is maintained at the same potential with re-respect to the 60-cycle alternating voltage as the power line 22. Because of this, no danger of a breakdown or a shorting of the main power system is produced even though the electrical conductor may actually become shorted to the power line. Of course, the possibility of a short circuit between the power line 22 and the electrical conductor 24 can be minimized by providing the electrical conductor with sufficient strength to prevent any danger of rupture and by properly insulating the conductor so that the insulation will not deteriorate under inclement weather conditions or as a result of a rubbing action against the power line. Furthermore, the electrical conductor 24 can be wound on existing power lines with only a brief interruption in service. The electrical conductor can be wound by winding devices which pull the conductor along the power line from pole to pole. The electrical conductor 24 can be knotted or otherwise attached to the electrical insulator at each pole.

The cost of the electrical conductor and of winding the electrical conductor on the power line would be only a small fraction of the cost involved in providing coaxial cables from a central point of distribution in a neighborhood to the individual homes in the neighborhood. Such coaxial lines may have to be provided in some of the proposed television systems and especially in the "Pay-TV" systems. For this reason, the winding of the electrical conductor 24 on the power line 22 offers definite advantages in the "Pay-TV" systems.

Electrical circuitry is connected between the power line 22 and the electrical conductor 24 to provide certain important functions. This circuitry includes a capacitance 40 connected between the power line 22 and one output terminal of the amplifier stages 38. A similar capacitance 42 is connected between the electrical conductor 24 and the other terminal of the tuned circuit formed by the amplifier stages 38.

The capacitances 40 and 42 have low impedances at the high frequencies of the television signals. This causes the capacitances 40 and 42 to appear effectively as short circuits at these high frequencies. Furthermore, the capacitances 40 and 42 have high impedances at the low frequencies such as 60 cycles per second. These high impedances prevent the alternating voltage at 60 cycles from being fed back through the amplifier stages 38 and the transformer 30 to the coaxial line 12.

An inductance 44 is connected across the power line 22 and the electrical conductor 24. Since the inductance 44 has a relatively low impedance at the frequency of the alternating voltage normally passing through the power line, relatively little voltage is produced across the inductance at the low frequency of 60 cycles per second. This causes the power line 22 and the electrical conductor 24 to have substantially the same potential with respect to the alternating voltage at 60 cycles. At the high frequencies of the television signals, the inductance 44 has a high impedance which serves to isolate the power line 22 and the electrical conductor 24 with respect to the television signals.

Power transformers such as a transformer 50 are normally included at different positions along the power lines to change the potentials in the power line. For example, a transformer may be included to step the alternating voltage down from approximately 220 volts to 110 volts as the power lines approach the different homes in the neighborhood from the central point of distribution. The transformer may also operate to convert three-phase alternating voltages to a single phase. The transformer 50 may include a primary winding 52 connected at end terminals and at a center tap to the three power lines in a three-phase system, one of the power lines being the line 22. The secondary winding 54 may be coupled ferromagnetically to the primary winding 52 to step down the voltage and to convert the three-phase electrical voltage into a single phase.

A power line 56 is connected to the secondary winding 54 to pass the alternating voltage for supplying power to different establishments including homes, offices and plants. The power line 56 may also be connected to pass the television signals. The television signals pass from the power line 22 to the power line 56 by connecting a capacitance 58 between the lines to provide a low impedance at the high frequencies of the television signals. Since the capacitance 58 has a high impedance at low frequencies such as 60 cycles, it cannot operate to by-pass the transformer 50 with respect to the alternating voltage.

An electrical conductor 60 is wound around the power line 56 in a manner similar to the physical relationship between the power line 22 and the electrical conductor 24. A capacitance 62 is coupled between the electrical conductors 24 and 60 in order to pass the television signals from the electrical conductor 24 to the electrical conductor 60. The capacitance 62 passes the television signals since it has a relatively low impedance at the high frequencies of the television signals.

An inductance 64 is connected between the power line 22 and the electrical conductor 24 at the position of the primary winding 52. Similarly, an inductance 66 is connected between the power line 56 and the electrical conductor 60 at a position near the secondary winding 54. Because of its low impedance at 60 cycles, the inductance 64 insures that the power line 22 and the electrical conductor 24 have substantially the same potential at their far ends for the alternating voltage at 60 cycles. Similarly, the inductance 66 operates to insure that the power line 56 and the electrical conductor 60 will have substantially the same potential at their near ends for the alternating voltage at 60 cycles.

The power line 56 and the electrical conductor 60 continue from the transformer 50 to a house, an office, a manufacturing plant or any other establishment. For purposes of convenience, this establishment will hereafter be designated as a house. At a position near the house, the electrical conductor 60 is coupled as by a capacitance 70 to the second power line which operates in conjunction with the line 56 to apply single-phase alternating voltage to the house. This second power line is designated at 72 in FIGURE 1. By including the capacitance 70, the difference in alternating voltage between the power lines 56 and 72 is maintained but both power lines are provided with the television signals as they enter the house. Since both power lines in the house receive the television signals and since the power lines are closely spaced, radiation of the signals from the power lines is minimized. The power lines are closely spaced because generally they are enclosed within a single sheath.

An impedance-matching unit generally indicated at 74 may be provided to match the impedance between the power lines 56 and 72 with the impedance between a pair of lines 76 and 78 which introduce the alternating voltage at low frequency into the house. The impedance matching network 74 may not be necessary under some circumstances when the impedance between the lines 56 and 72 approaches the impedance between the lines 76 and 78. Amplifier stage may also be required if the television signals have to pass through the power lines for a considerable distance such as 1000 feet or more in order to reach the house.

The lines 76 and 78 extend from the impedance matching network 74 to a watt meter 80 which may be located against against an outside wall of the house or in a cellar of the house. Since the wattmeter 80 generally includes an inductance, it may block the passage of the television signals into the house. For this reason, capacitances 82 and 84 are included to provide a bypass around the watt meter 80 and a corresponding line 86 on the output side of the watt meter. Similarly, the capacitance 84 is connected between the line 76 on the input side of the watt meter and a corresponding line 88 on the output side of the watt meter.

Different branches are connected to the lines 86 and 88 to supply electrical energy to different parts of the house. For example, a branch formed by lines 90 and 92 may extend from the lines 86 and 88 to a first power outlet in the house, this power outlet being located in the kitchen. Similarly, a branch formed by lines 94 and 96 may extend to a second power outlet in the house, this power outlet being located in the den. Generally only one of the branches has to carry the television signals, since there is only one television receiver in the house and this receiver is connected to receive electrical power from only one power outlet. Preferably, the power outlet supplying power to the receiver should not be loaded with electrical appliances or machinery. This is generally the case since the receiver is located in the den or living room and the appliances are located in the kitchen, service porch or cellar. Because of this, filters are provided in the branches leading to the other power outlets so as to remove the television signals from these branches. This filtering action is provided by modified fuses 98 which include inductances having a high impedance at high frequencies and having a low impedance at the low frequencies such as 60 cycles. The modified fuses 98 may be packaged to include the current fuses now installed in branch circuits or may be built as separate fuses which would be connected in series with the current fuses now being used. A modified fuse is preferably connected in each of the two power lines in a branch such as the lines 90 and 92 in one branch.

Special electrical circuitry is included in the electrical lines leading to the antenna of the television receiver and is indicated in block form as an adapter 100. This circuitry includes capacitances 102 and 104 in series between each of the power lines in the branch and the adaptor 100.

The capacitances 102 and 104 block the passage of the alternating voltage at low frequencies such as 60 cycles but pass the television signals at high frequencies. In this way, the adaptor 100 is responsive only to the television signals.

As has been previously described, the video and audio signals have selected carrier frequencies such as 0.75 megacycle and 5 megacycles respectively. These signals are unable to pass through any television channel since each television channel is responsive to carrier signals at a particular frequency. For example, channels 2, 3 and 4 are responsive to particular carrier frequencies in the range between 54 and 72 megacycles; channels 5 and 6 are responsive to particular carrier frequencies in the range between 76 and 88 megacycles; and channels 7 through 13, inclusive, are responsive to particular carrier frequencies in the range between 174 and 216 megacycles.

In order for the audio and video signals to pass through a particular channel, these signals have to be mixed with signals at a particular carrier frequency corresponding to the selected frequency for a particular channel. For example, in the Los Angeles area, channel 3 at present is not being used. Because of this, this channel may be selected for use in a "Pay-TV" system to provide pictures to viewers subscribing to the "Pay-TV" system. Under such circumstances, the video and audio signals are mixed with a carrier signal to obtain a carrier frequency of 61.25 megacycles for the video signals and a carrier frequency of 65.25 megacycles for the audio signals. These carrier signals have the proper frequency to pass through the receiver when the channel selector switch in the receiver is set to channel 3.

Figure 2:
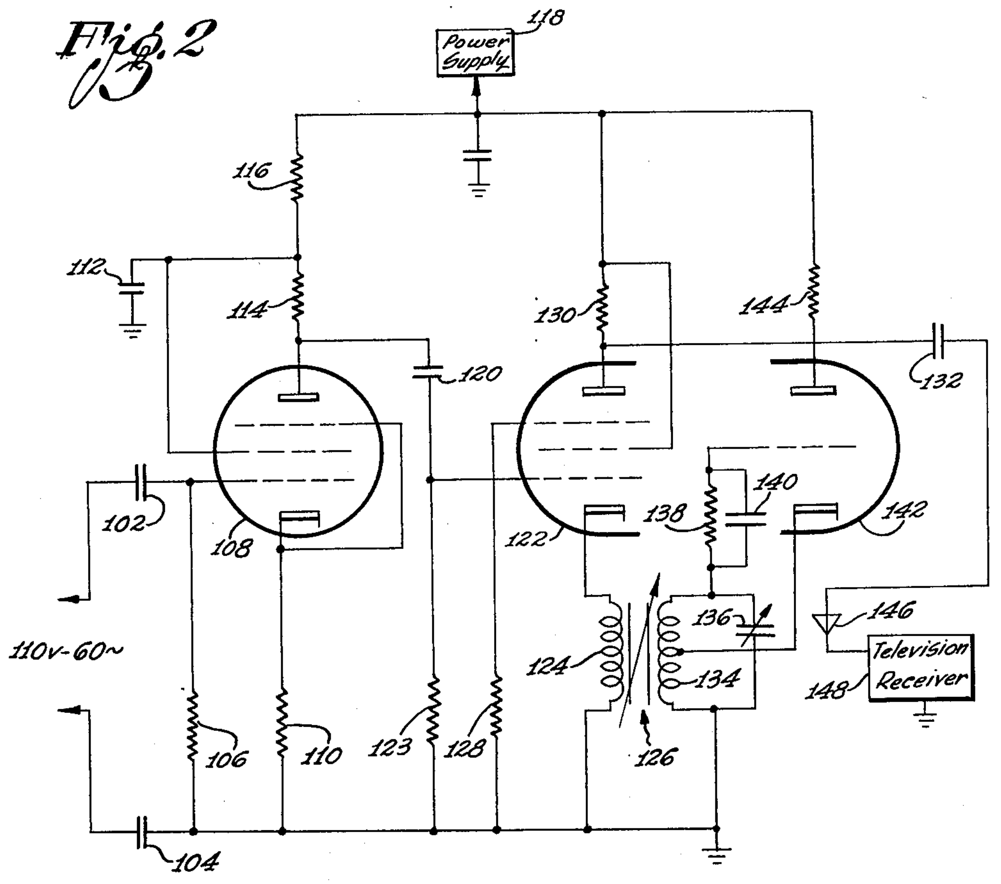
FIGURE 2 is a circuit diagram illustrating in further detail certain stages in the receiver for producing a proper operation of the receiver to convert the television signals into a pictorial image and the accompanying sound.

Electrical circuitry is shown in FIGURE 2 for producing the proper carrier signals for passing through a selected television channel. This circuitry indicates in detail the adaptor 100 shown in block form in FIGURE 1. This electrical circuitry includes the coupling capacitances 102 and 104, which are also shown in FIGURE 1. The coupling capacitances 102 and 104 may be provided with suitable values such as 0.001 microfarad. A resistance 106 having a suitable value such as approximately 500 kilo-ohms is connected between the coupling capacitances 102 and 104. The coupling capacitance 104 is grounded and the coupling capacitance 102 is connected to the control grid of a tube 108, which may be a type 6AH6. A connection is made from the cathode and suppressor grid of the tube 108 to one terminal of a resistance 110 having its second terminal grounded. The resistance 110 may be provided with a suitable value such as approximately 220 ohms.

A capacitance 112 having a suitable value such as approximately 20 microfarads extends from the screen grid of the tube 108 to ground. The capacitance is also connected to the common terminal betweeen a pair of resistances 114 and 116, which are in series between the plate of the tube 108 and the positive terminal of a power supply 118. The resistances 114 and 116 may respectively have suitable values such as approximately 690 ohms and 800 ohms. The signals produced on the plate of the tube 108 are coupled through a capacitance 120 to the control grid of a tube 122, which may be included as one of the two tubes in a type 608 envelope. A resistance 123 having a suitable value such as approximately 500 kilo-ohms is connected between the control grid of the tube 122 and ground.

A winding 124 in a transformer generally indicated at 126 extends electrically from the cathode of the tube 122 to ground. A resistance 128 having a suitable value such as 100 ohms is connected between the suppressor grid of the tube 122 and ground. The screen grid of the tube 122 is connected directly to the power supply 118 and the plate is coupled through a resistance 130 to the power supply. The resistance 130 may be provided with a suitable value such as 8 kilo-ohms. The signals produced on the plate of the tube 130 are introduced through a capacitance 132 to an antenna 146 in a receiver 148. The signals then pass from the antenna to the successive stages such as the amplifier and detector stages in a receiver. These stages may be constructed in a conventional manner.

The transformer 126 also has a winding 134, one end terminal of which is grounded. A variable capacitance 136 is in parallel with the winding 134 across both end terminals of the winding. A resistance 138 and a capacitance 140 are in parallel between the ungrounded end terminal of the winding 134 and the control grid of a tube 142, which may be included in the type 6U8 envelope. The cathode of the tube 142 has a common connection with the center tap of the winding 134. The plate of the tube 142 receives a positive potential from the power supply 118 through a resistance 144 having a suitable value such as 300 ohms.

As previously described, the capacitances 102 and 104 operate to filter out the alternating voltage of 60 cycles from the signals passing through the power lines so that only the audio and video signals are introduced to the control grid of the tube 108. The capacitances even operate to filter out transient signals produced when electrical lights, applicances or electrical machinery are turned on or off. These audio and video signals are amplified by the tube 108 and are introduced to the control grid of the tube 122. The signals are mixed in the tube 122 with carrier signals produced by the oscillator which includes the tube 142 and the tuned circuit formed by the winding 134 and the capacitance 136. The signals then pass to the stages in the receiver for separating the audio and video signals and for converting the video signals into a visual image and the audio signals into the accompanying sound.

In connection with experiments leading to this invention, it has been found that there can be a considerable amount of distortion in the characteristics of the audio or video signals before any appreciable distortion becomes apparent in the resultant visual images produced or in the sound produced. For example, the television signals can be reflected from power line branches in the house other than the branch leading to the receiver. These reflections produce only a displacement in the order of 0.01 inch on the television screen from the main image on the screen so as to obtain only a slightly offset double image. This offset in position is so small that it is not apparent to the eye.

In "Pay-TV" systems the subscriber has to pay for each program that he views. This payment, of course, can be made on a cumulative basis for all of the programs that he views during a particular period of time such as a month. For this reason, a record has to be kept as to the programs viewed by him. This record can be kept at a central station for all of the homes in a key area. For example, one accounting or central station 151 may service approximately 10,000 homes in a key area. The signals indicating the reception of a program may be transmitted through the power lines to the central accounting station. These power lines may be the same lines as those which pass the television signals to the different homes in the area.

Various types of systems may be used to indicate to the central accounting station when a program is being viewed by a subscriber on a particular channel. For example, each television receiver may be provided with an oscillator similar to that shown in FIGURE 2. The oscillator in each receiver may be crystal controlled so as to produce signals at a selected frequency which is different from the frequency of the signals produced by the oscillator in every other receiver in that area. This oscillator is indicated in block form at 150 in FIGURE 1 and may be energized by signals from the adaptor 100 so as to produce signals only when the television receiver is on and is tuned to the proper channel such as channel 3. The frequency of the signals produced by each oscillator may be separated by approximately 1 kilocycle from the frequency of the signals produced by any other oscillator. The lower frequency limit for the signals from any of the oscillators may be slightly above the upper frequency limit of the particular television channel and slightly below the lower frequency limit of the next television channel.

The oscillator 150 described in the last two paragraphs may be connected to produce oscillations only when the particular television channel is being viewed by the subscriber. At such times, the signals produced by the oscillator pass through the power lines to the central accounting station, which operates to record the times that the oscillations are received. Appropriate filters may be included at the central station to inhibit the passage to the recorder at the television station of the television signals travelling to the different receivers in the area and to inhibit the passage of the alternating electric voltage at 60 cycles.

The system described above has certain important advantages. It utilizes present facilities such as power lines to obtain the passage of television signals to the home without producing any apparent distortions in the visual images produced at the television receiver in the homes and without producing any distortion in the accompanying sound. The system provides these advantages at a considerable reduction in cost over comparable systems since such comparable systems have to use coaxial lines extending to each individual home. This would require that coaxial lines be strung from existing facilities to each house.

The system constituting this invention also has other important advantages, especially when used for the transmission and reception of "Pay-TV" signals. For example, only houses subscribing to the "Pay-TV" programs will receive the signals passing through the power lines since only these houses will have the electrical conductors such as the conductors 24 and 60 wound around the power line or power lines extending to the house. In the event that the subscription to the "Pay-TV" programs is cancelled, the looped conductor along at least a portion of the power line can be removed with very little expense and very little inconvenience.

Although the system constituting this invention has important uses for the transmission and reception of "Pay-TV" programs, it can also be used for other end results. By way of illustration, the system can be used in industrial television to transmit television signals through power lines to remote locations within a plant. If desired, only the video signals can be passed through the power lines since the audio signals can be introduced to an ordinary intercom system for the production of sound at various positions in the plant.

The system constituting this invention also has another important advantage in that it introduces to a central station signals indicating the times that a particular channel is being viewed by each individual receiver. This results from the inclusion of circuitry which becomes triggered into operation only when the particular channel is being viewed. When triggered, this circuitry provides signals individual to each receiver. These identifying signals may be in the form of oscillatory signals having an individual frequency for each receiver or they may be in the form of a plurality of pulses having time spacings unique to the particular receiver or they may be in any other suitable form.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for providing for the transmission of television signals between a transmitter and at least one receiver disposed in a house having a plurality of power outlets, means for providing first signals modulated in accordance with the light pattern of a pictorial image to represent the image, means for providing second signals modulated in accordance with audio patterns at successive instants of time to represent the audio patterns, power lines for receiving alternating signals to provide electrical energy at the power outlets in the house, means including the power lines and including means coupled to the power lines for providing for the transmission of the first and second modulating signals through the power lines toward the receiver along at least part of the path between the transmitter and the receiver, and means in the house for providing for the introduction of only the modulating signals to the receiver for the production of light images and sounds corresponding to the modulations in the first and second signals.

2. In a system for providing for the transmission of television signals between a transmitter and at least one receiver which is disposed in a house having a plurality of power outlets and which is provided with a particular channel for the reception of the television signals, means for providing first signals modulated in accordance with the light intensities at different positions in a pictorial image, means for providing second signals modulated in accordance with the sound accompanying the pictorial images at successive instants of time, a power line for introducing an alternating voltage at a low frequency to the house for supplying power to the outlets in the house, means including the power line and including means coupled to the power line for obtaining a transmission of the first and second modulating signals toward the house and for obtaining such a transmission with a retention of characteristics in the modulated signals to retain picture and sound quality at the receiver, means at the house for filtering the low frequency alternating signals before introduction of the first and second modulating signals to the television receiver, and means at the receiver for providing a carrier signal tuned for passage through the particular channel and for modulating the carrier signal with the first and second modulating frequencies before introduction of the modulated signal to the receiver.

3. In a system for providing for the transmission of television signals between a transmitter and at least one receiver which is disposed in a house having a plurality of power outlets and which is provided with a particular channel for the reception of the television signals, means for providing first signals modulated in accordance with the light intensities at different positions in a pictorial image, means for providing second signals modulated in accordance with the sound accompanying the pictorial images at successive instants of time, means including coaxial lines for providing for the transmission of the first and second modulating signals from the transmitter toward a position approaching the receiver, at least one power line extending from the coaxial line to the house to supply electrical energy to the power outlets for use in the house, means for coupling the coaxial line to the power line to match the impedances of the coaxial line and the power line and having characteristics for passing the first and second modulating signals, and means at the house for passing to the receiver only the first and second modulating signals in the power line for the production of visual images and sound dependent upon the modulations in the first and second signals.

4. In a system for providing for the transmission of television signals between a transmitter and at least one receiver which is disposed in a house having a plurality of outlets and which is provided with a particular channel for the reception of the television signals, means including electrical circuitry for providing first signals having a first particular frequency and modulated in accordance with variations in the visual image at successive positions, means including electrical circuitry for providing second signals having a second particular frequency and modulated in accordance with variations in the audio characteristics at successive instants of time, means including electrical circuitry and including coaxil lines coupled to the electrical circuitry for providing for the transmission of the first and second modulating signals to a position approaching the receiver, a power line for introducing alternating signals to the power outlets in the housing at a frequency below the first and second particular frequencies, means including electrical circuitry coupled to the coaxial line and the power line for balancing the impedances of the lines and having characteristics for passing the modulating signals at the first and second particular frequencies, means including electrical circuitry at the house for filtering the low frequency signals to pass only the signals at the first and second modulating frequencies to the receiver, means including electrical circuitry at the receiver for providing carrier signals at a frequency tuned for a passage of the signals through the particular channel and for modulating the carrier signals with the first and second modulating signals, and means including electrical circuitry at the receiver for detecting the carrier signals and for demodulating the first and second modulating signals to reproduce the visual image and the sound.

5. In combination for providing for the transmission of information signals between a transmitter and a receiver removed from the transmitter, a power line connected to receive electrical energy for supplying power to the receiver and connected to receive the information signals, and an electrical conductor wrapped around the power line at spaced intervals and coupled electrically to the power line at its opposite ends to inhibit radiation of the information signals from the power line.

6. In combination for providing for the transmission of television signals at high frequencies from a transmitter to a receiver removed from the transmitter and disposed in a house having a plurality of power outlets, a power line connected to receive an alternating electrical voltage at a low frequency relative to the frequencies of the television signals and to apply these signals to the power outlets at the house and connected to receive the television signals and to apply these signals to the receiver at the house, means including electrical circuitry coupled to the power line to inhibit radiation of the television signals from the power line, and means at the house for separating the television signals and the alternating electrical voltage to obtain an introduction of the television signals to the receiver and to obtain the introduction of the alternating electrical voltage to the power outlets.

7. In combination for providing for the transmission of information signals including television signals between a transmitter and a receiver removed from the transmitter and disposed in a house having a plurality of power outlets, a power line connected to receive electrical energy at a low frequency relative to the frequencies of the television signals and to apply these signals to the power outlets at the house and connected to receive the television signals and to apply these signals to the receiver at the house, and an electrical conductor extending along the power line and disposed in relatively tight spiral loops around the power line at spaced intervals and coupled electrically to the power line at its opposite ends to minimize the radiation of the information signals from the power line during the transmission of the information signals along the power line.

8. In combination for providing for the transmission of television signals at high frequencies from a transmitter to a receiver removed from the transmitter and disposed in a house, a power line for introducing alternating voltage to the house to provide electrical energy for the house, the power line being connected to transmit the television signals in mixed relationship with the alternating voltage, an electrical conductor extending along the power line and disposed in looped relationship around the power line at spaced intervals to inhibit the radiation of the television signals from the power line, and means including electrical circuitry coupled to the power line and the electrical conductor at opposite ends of the electrical conductor to maintain the power line and the electrical conductor at substantially the same potential with respect to the alternating voltage and to prevent feedback of the alternating voltage to the transmitter.

9. In combination for providing for the transmission of television signals at high frequencies from a transmitter to a receiver removed from the transmitter and disposed in a house having a plurality of power outlets, a power line connected to receive an alternating electrical voltage at a low frequency relative to the frequencies of the television signals and to apply these signals to the power outlets at the house and connected to receive the television signals and to apply these signals to the receiver at the house, an electrical conductor wrapped around the power line at spaced intervals to inhibit the radiation of the television signals from the power line during the passage of these signals along the power line, and means including first reactances disposed electrically in series with the power line and the electrical conductor to prevent the feedback of the alternating electrical voltage at the low frequency toward the transmitter and including a second reactance connected across the power line and the electrical conductor to maintain the power line and the electrical conductor at the same potential with respect to the alternating electrical voltage but substantially at an open circuit with respect to the television signals.

10. The combination as set forth in claim 9 in which the first reactances are capacitive and the second reactance is inductive.

11. In combination for providing for the transmission of television signals from a transmitter to a receiver removed from the transmitter and disposed in a house having a plurality of power outlets, a coaxial line connected to receive the transmitted television signals and to direct the signals toward the receiver, a power line connected to receive an alternating voltage and to direct the alternating voltage toward the house for supplying energy to the power outlets at the house, the power line being coupled to the coaxial line to receive the television signals from the coaxial line, means including electrical circuitry coupled between the coaxial line and the power line for providing a balanced impedance and band-pass characteristics to obtain a passage of signals to the power line from the coaxial line and for providing a high impedance to the alternating voltage from the power line to prevent this alternating voltage from being fed back to the coaxial line, and means including electrical circuitry coupled to the power line for inhibiting radiation of the television signals from the power line.

12. In combination for providing for the transmission of television signals from a transmitter to a receiver removed from the transmitter and disposed in a house having a plurality of power outlets, a coaxial line connected to receive the transmitted television signals and to direct the signals toward the receiver, a power line connected to receive electrical energy at a low frequency relative to the television receiver and to direct the signals toward the power outlets, means including balanced impedance means coupled to the coaxial line and the power line for providing a transfer of the television signals from the coaxial line to the power line, an electrical conductor spirally looped around the power line at spaced intervals and in closely spaced relationship to the power line to inhibit the radiation of the television signals from the power line, and means including reactance means coupled to the power line and the electrical conductor for preventing any feedback of the alternating voltage from the power line to the coaxial line and for maintaining the electrical conductor and the power line at substantially the same potential with respect to the alternating voltage.

13. In a sysem for providing for the transmission of television signals between a transmitter and at least one receiver which is disposed in a house having a plurality of power outlets and which is provided with a particular channel for the reception of the television signals, means including electrical circuitry for providing first signals modulated in accordance with the light intensities at different positions in a pictorial image, means including electrical circuitry for providing second signals modulated in accordance with the sound accompanying the pictorial images at successive instants of time, means including a coaxial line and including balancing impedances coupling the first and second signal means to the coaxial line for providing for the transmission of the first and second signals to a position approaching the house, a power line for providing for the introduction of electrical energy at a low alternating frequency to the power outlets in the house, means including the power line and including electrical circuitry coupled to the power lines for balancing the impedances of the coaxial and power lines and for providing a flat response band covering the frequencies of the first and second modulating signals to obtain a passage of signals from the coaxial line to the power line without appreciable loss in attenuation, means including electrical circuitry coupled to the power line for preventing the feedback of alternating signals at low frequencies from the power line to the coaxial line, means including electrical circuitry coupled to the power lines for providing for the passage of the first and second signals through the power line without material distortion in the modulating characteristics, means including electrical circuitry at the house for filtering the first and second modulating signals before the introduction of the alternating voltage to the power outlets, means including electrical circuitry at the house for filtering the electrical energy at the low frequency before introduction of the first and second modulating signals to the receiver, and means including electrical circuitry at the receiver for obtaining a reproduction of the visual image and the accompanying sound.

14. In a system as set forth in claim 13, means for measuring the amount of electrical energy introduced to the house, and means including electrical circuitry at the house and coupled to the measuring means for bypassing the first and second modulating signals relative to the measuring means to provide a measurement of only the electrical energy passing into the house.

15. In combination for the transmission of television signals from a transmitter to a receiver removed from the transmitter and disposed in a house having a plurality of power outlets, a coaxial line connected to receive the transmitted television signals and to direct the signals toward the receiver, a power line connected to receive an alternating electrical voltage at a low frequency relative to the television signals and to direct the alternating voltage toward the power outlets, means including electrical circuitry having characteristics for balancing the impedances of the coaxial line and the power line and having band pass characteristics for passing the television signals and coupled electrically to the coaxial line and the power line, an electrical conductor coupled at its opposite ends to the power line and closely spaced to the power line relative to the wave lengths of the television signals and provided with an opposite polarity to the television signals relative to the television signals in the power line, means coupled to the electrical conductor and the power line for maintaining the electrical conductor and the power line at substantially the same potential relative to the alternating electrical voltage and for preventing feedback of the television signals along the power line, means at the house and coupled to the power line to prevent the passage of the television signals to different power outlets in the house, and means at the house and coupled to the power line to prevent the introduction of the alternating electrical voltage as a signal to control the operation of the receiver.

16. In a system for providing for the transmission of television signals between a transmitter and at least one receiver which is disposed in a house having a plurality of power outlets and which is provided with a plurality of channels, means for providing for the transmission of signals modulated to represent the characteristics of the visual image and the accompanying sound at any instant, means coupled to the transmitter and including a power line for providing for the passage of the transmitted signals to the receiver, means at the receiver and responsive to the signals passing through the power line for obtaining the passage of the signals through a particular channel for the conversion of the signals into the visual image and the accompanying sound, and means at the receiver and operative upon the passage of the signals through the particular channel to produce signals for passage through the power lines and having characteristics unique to the particular receiver to indicate that the particular channel is being viewed at that instant.

17. In a system for providing for the transmission of television signals between a transmitter and at least one receiver which is disposed in a house having a plurality of power outlets and which is provided with a plurality of channels, means including electrical circuitry for providing for the transmission of signals modulated to represent the characteristics of the visual image and the accompanying sound at any instant, a power line for providing for the introduction of electrical energy to the power outlets, a conductor looped around the power line at spaced intervals along the length of the power line to minimize radiation from the power line, means including the power line and the conductor and including electrical circuitry coupled to the power line and the conductor for providing for the transmission of the modulated signals to the receiver, means including electrical circuitry at the receiver and responsive to the modulated signals for providing for the passage of the modulated signals through a particular one of the channels in the receiver, a central station for recording the times that the modulated signals pass through the particular channel in the receiver, and means including electrical circuitry at the receiver and responsive to the modulated signals passing through the particular channel for producing signals individual to the receiver for introduction of these signals to the power line for passage to the central station.

18. In a system for providing for the transmission of television signals between a transmitter and at least one receiver which is disposed in a house having a plurality of power outlets and which is provided with a plurality of channels, means for providing first signals modulated in accordance with the light pattern of a pictorial image to represent the image, means for providing second signals modulated in accordance with audio patterns at successive instants of time to represent the audio patterns, power lines for receiving alternating signals to provide electrical energy at the power outlets in the house, coaxial lines, means coupled to the coaxial lines and the modulating means for matching the impedances of the modulating means and the coaxial lines to obtain the passage of the first and second modulating signals through the coaxial lines, means coupled to the coaxial lines and the power lines for matching the impedances of these lines and for providing band-pass characteristics to obtain the passage of the modulating signals through the lines, means coupled to the power lines at the house for providing for the passage of the modulating signals to the receiver without the passage of the alternating signals to produce the pictorial image and the accompanying audio patterns, means responsive to the signals passing to the receiver for producing signals for introduction to the power line and having characteristics identifying the receiver and for producing such signals only upon the reception of the modulating signals by the receiver, and a central station coupled to the power line for receiving the signals produced by the last mentioned means to obtain a record of the reception of the signals by the receiver.

19. In a system as set forth in claim 2, a central station responsive to incoming signals for providing an indication of the times that the first and second modulated signals are being received at the receiver, and means responsive to the carrier signals at the receiver for producing signals for transmission to the central station and having characteristics unique to the receiver to provide an identification of the receiver to the central station.

References Cited in the file of this patent

UNITED STATES PATENTS

| | | |
|---|---|---|
| 1,730,412 | Duncan | Oct. 8, 1929 |
| 1,835,031 | Espenschied | Dec. 8, 1931 |
| 1,855,288 | Green | Apr. 26, 1932 |
| 2,268,812 | Foster | Jan. 6, 1942 |
| 2,570,209 | Cotsworth | Oct. 9, 1951 |
| 2,573,349 | Miller | Oct. 30, 1951 |
| 2,577,731 | Berger | Dec. 11, 1951 |
| 2,628,275 | Parker | Feb. 10, 1953 |
| 2,876,279 | Fuller | Mar. 3, 1959 |

FOREIGN PATENTS

| | | |
|---|---|---|
| 678,391 | Great Britain | Sept. 3, 1952 |

OTHER REFERENCES

"Television Network Facilities," Abraham and Romnes, Electrical Engineering, volume 66, May 1947; pages 477–482.